United States Patent
Steiss (10) Patent No.: US 10,649,786 B2
(45) Date of Patent: May 12, 2020

(54) REDUCED STACK USAGE IN A MULTITHREADED PROCESSOR

(71) Applicant: Cisco Technology, Inc., San Jose, CA (US)

(72) Inventor: Donald E. Steiss, Richardson, TX (US)

(73) Assignee: Cisco Technology, Inc., San Jose, CA (US)

(*) Notice: Subject to any disclaimer, the term of this patent is extended or adjusted under 35 U.S.C. 154(b) by 353 days.

(21) Appl. No.: 15/367,008

(22) Filed: Dec. 1, 2016

(65) Prior Publication Data

US 2018/0157493 A1    Jun. 7, 2018

(51) Int. Cl.

| G06F 9/38 | (2018.01) |
| G06F 9/30 | (2018.01) |
| G06F 9/50 | (2006.01) |
| G06F 12/14 | (2006.01) |
| G06F 12/1027 | (2016.01) |

(52) U.S. Cl.
CPC .......... *G06F 9/3865* (2013.01); *G06F 9/3016* (2013.01); *G06F 9/30054* (2013.01); *G06F 9/30101* (2013.01); *G06F 9/30123* (2013.01); *G06F 9/30134* (2013.01); *G06F 9/3851* (2013.01); *G06F 9/3861* (2013.01); *G06F 9/5016* (2013.01); *G06F 12/1027* (2013.01); *G06F 12/1441* (2013.01); *G06F 2212/681* (2013.01)

(58) Field of Classification Search
CPC . G06F 9/3865; G06F 9/30054; G06F 9/30101
See application file for complete search history.

(56) References Cited

U.S. PATENT DOCUMENTS

| 5,101,486 A | 3/1992 | Okamoto | |
| 2004/0019744 A1 | 1/2004 | Boucher | |
| 2007/0271441 A1* | 11/2007 | Shaw | G06F 9/3005 |
| | | | 712/41 |
| 2007/0282928 A1* | 12/2007 | Jiao | G06F 9/485 |
| 2012/0017214 A1 | 1/2012 | Shannon et al. | |
| 2012/0291126 A1* | 11/2012 | Lagar-Cavilla | G06F 21/56 |
| | | | 726/22 |

(Continued)

FOREIGN PATENT DOCUMENTS

| JP | S6057439 A | 4/1985 |
| JP | H02214938 A | 8/1990 |

OTHER PUBLICATIONS

Partial European Search Report for Application No. EP 17 18 3239 dated Feb. 12, 2018.

(Continued)

*Primary Examiner* — Aimee Li
*Assistant Examiner* — William V Nguyen
(74) *Attorney, Agent, or Firm* — Patterson + Sheridan, LLP (57) ABSTRACT

Embodiments are generally directed to a multithreaded processor for executing a plurality of threads, as well as an associated method and system. The multithreaded processor comprises a first control register configured to store a stack limit value, and instruction decode logic configured to, upon receiving a procedure entry instruction for a stack associated with a first thread, determine whether to throw a stack limit exception based on the stack limit value and a first predefined stack region size associated with the stack.

20 Claims, 7 Drawing Sheets

(56) References Cited

U.S. PATENT DOCUMENTS

2015/0150024 A1\* 5/2015 Grossi ................ G06F 9/30134
718/108
2016/0092229 A1\* 3/2016 Scott .................... G06F 9/3806
712/238

OTHER PUBLICATIONS

ARM: "The ARM-THUMB Procedure Call Standard: Development Systems Business Unit Engineering Software Group", Document No. SWS ESPC 0002 A-05, Nov. 5, 1998, pp. 1-37.
Advanced RISC Machines Ltd.: "ARM Procedure Call Standard", 1994 (Accessed Nov. 28, 2016 at https://www.cl.cam.ac.uk/~fms27/teaching/2001-02/arm-project/02-sort/apcs.txt).
European Patent Office Examination Report for Application 17 183 239.-1203 dated Jan. 14, 2020.

\* cited by examiner

REDUCED STACK USAGE IN A MULTITHREADED PROCESSOR

TECHNICAL FIELD

Embodiments presented in this disclosure generally relate to computer architecture, and more specifically, techniques for reducing the amount of stack usage in a multithreaded processor.

BACKGROUND

Multithreaded processors support execution of many processes occurring in parallel, such as using thread-level or process-level parallelism. For example, a multithreaded network processor may permit thousands of threads to simultaneously operate to process network traffic packets.

Generally, a stack region is allocated in memory for each thread. However, allocating memory for a large number of threads supported by a multithreaded processor can require a relatively large amount of memory, which occupies a significant amount of space on an integrated circuit (IC) comprising the multithreaded processor, and in some cases limits other functionality that may be implemented in the IC.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a multithreaded processor for executing a plurality of threads. The multithreaded processor comprises a first control register configured to store a stack limit value, and instruction decode logic configured to, upon receiving a procedure entry instruction for a stack associated with a first thread, determine whether to throw a stack limit exception based on the stack limit value and a first predefined stack region size associated with the stack.

Another embodiment presented in this disclosure is a method performed by a multithreaded processor executing a plurality of threads. The method comprises receiving a procedure entry instruction at instruction decode logic of the multithreaded processor, the procedure entry instruction corresponding to a first thread of the plurality of threads and a stack associated therewith. The method further comprises accessing a first control register of the multithreaded processor to retrieve a stack limit value, and determining whether to throw a stack limit exception based on the stack limit value and a first predefined frame size associated with the procedure entry instruction.

Another embodiment presented in this disclosure is a system comprising a multithreaded processor configured to execute a plurality of threads and a memory coupled with the multithreaded processor. The memory comprises a plurality of first memory pages, each first memory page comprising a first plurality of memory regions each having a first predefined stack region size, a first stack assigned to a first memory region of the first plurality of memory regions, the first stack corresponding to a first thread of the plurality of threads. The memory further comprises a plurality of second memory pages, each second memory page comprising a second plurality of memory regions each having a second predefined stack region size greater than the first predefined stack region size. The multithreaded processor is configured to throw a stack limit exception upon determining that a size of the first stack will exceed the first predefined stack region size, and reassign, upon throwing the stack limit exception, the first stack to a second memory region of the second plurality of memory regions.

EXAMPLE EMBODIMENTS

Embodiments are generally directed to a multithreaded processor for executing a plurality of threads. The multithreaded processor comprises a first control register configured to store a stack limit value and instruction decode logic configured to, upon receiving a procedure entry instruction for a stack associated with a first thread, determine whether to throw a stack limit exception based on the stack limit value and a first predefined stack region size associated with the stack. In some embodiments, the multithreaded processor further comprises a second control register configured to store a plurality of stack limit enable bits, where each stack limit enable bit of the plurality of stack limit enable bits corresponds to a respective thread of the plurality of threads. Here, the instruction decode logic is further configured to determine, upon receiving the procedure entry instruction and based on a first stack limit enable bit of the plurality of stack limit enable bits that is associated with the first thread, whether to determine whether to throw the stack limit exception. Including specialized control registers for storing a stack limit value and/or a plurality of stack limit enable bits generally allow each thread's stack to be allocated a tailored amount of memory, which reduces the overall amount of memory needed to support the plurality of threads while still supporting acceptable processing performance for general cases.

Figure 1:
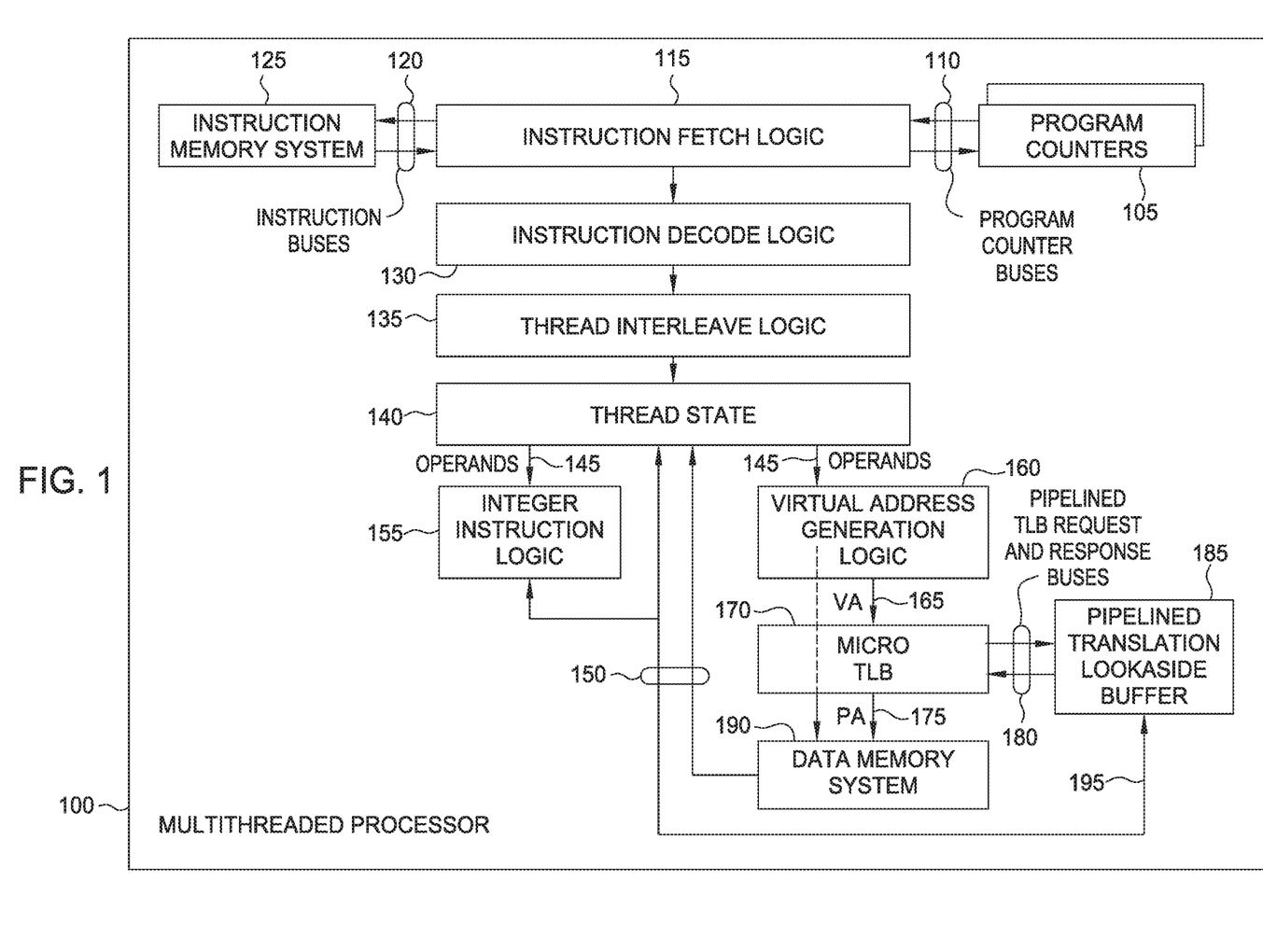
FIG. 1 is a block diagram of an exemplary multithreaded embedded processor, according to one or more embodiments disclosed herein.

FIG. 1 is a block diagram of an exemplary multithreaded embedded processor, according to one or more embodiments disclosed herein. Generally, a multithreaded processor 100 may be used in conjunction with a pipelined translation look-aside buffer (TLB) 185. The pipelined TLB 185 described below can generally be used in any computer system or computer architecture that uses address translation. For example, the pipelined buffering scheme described below can be used with personal computers (PCs), supercomputers, personal digital assistants (PDAs), digital signal processors (DSPs), packet processing systems, etc. In some embodiments, the multithreaded processor 100 comprises a network processor configured to process and route data packets. However, the following description is included to illustrate the operation of preferred embodiments rather than to limit the scope of the disclosure.

Multiple program counters 105 store values in instruction memory 125 corresponding to the next instructions to be fetched for associated threads supported by the multithreaded processor 100. Program counter buses 110 convey the values from the program counters 105 to instruction fetch logic 115 and convey updates from instruction fetch logic 115 to the program counters 105. The instruction fetch logic 115 generally sequences instruction fetches from an instruction memory system 125, detects exceptions related to instruction fetching, and identifies instruction boundaries.

Instruction buses 120 convey instruction addresses from the instruction fetch logic 115 to the instruction memory system 125, and convey results from the instruction memory system 125 back to the instruction fetch logic 115. The instruction memory system 125 looks up instructions using a static random access memory (SRAM) or caches, and returns the instructions to the instruction fetch logic 115.

The instruction fetch logic 115 sends raw instruction bytes to instruction decode logic 130 for mapping the raw instruction bytes into control signals to operate the multithreaded embedded multithreaded processor 100. Thread interleave logic 135 examines the control signals from the instruction decode logic 130 and past history to determine which thread should execute the next instruction.

Based on the result(s) of the thread interleave logic 135, thread state 140 produces operands 145 for integer instruction logic 155 and for virtual address generation logic 160. Results from the integer instruction logic 155 and data memory system 190 are used to update the thread state 140 via result buses 150. Integer instruction logic 155 uses operands 145 and signals from the instruction decode logic 130 to evaluate integer operations such as addition, subtraction, shifting and masking.

Virtual address generation logic 160 uses operands 145 to compute a virtual address (VA) 165 using, e.g., shifting and addition. The virtual address 165 is passed to a micro TLB 170. The micro TLB 170 converts the virtual address 165 into a physical address (PA) 175. The micro TLB 170 contains a small cache of virtual address to physical address translations to support low latency lookups, but generally may suffer a higher miss rate than a larger TLB.

The micro TLB 170 posts miss requests over pipelined TLB request and response buses 180 to the pipelined TLB 185. Results from the pipelined TLB 185 are transmitted back to the micro TLB 170 over the pipelined TLB request and response buses 180. Data memory 190 acts on the address from bus PA 175 and operands 145 to perform memory load and store operations. The results from data memory 190 are returned to the thread state 140 over result buses 150 and may include addresses, data, or any other information needed by the integer instruction logic 155 for conducting logic operations. When the multithreaded processor 100 is used for packet processing, the data memory system 190 may also contain packet data. The integer instruction logic 155 can also be used to read and write entries in the pipelined TLB 185 via buses 195.

As described above, the multithreaded processor 100 may need to access a larger physical memory space (corresponding to PA 175) than what is provided by the internal virtual address space (corresponding to VA 165). Accordingly, the TLBs 170 and 185 provide virtual to physical address translations that effectively increase the size of physical address space accessible by the multiple threads of multithreaded processor 100.

Pipelined TLB 185 holds a relatively large number of address translations and is permitted to perform translations with a higher latency than the micro TLB 170. Even though the content-addressable memories (CAMs) used in the pipelined TLB 185 can be relatively slow, the pipelined TLB 185 can still provide one address translation per clock cycle to avoid stalling of unrelated threads.

In one embodiment, the pipelined TLB 185 provides a fully associative memory mapping with the power advantages of set-associative memory mapping. The pipelining structure in TLB 185 is also well-adapted to the multithreaded processor 100 described in FIG. 1 where multiple memory lookups may be evaluated in parallel.

Figure 2:
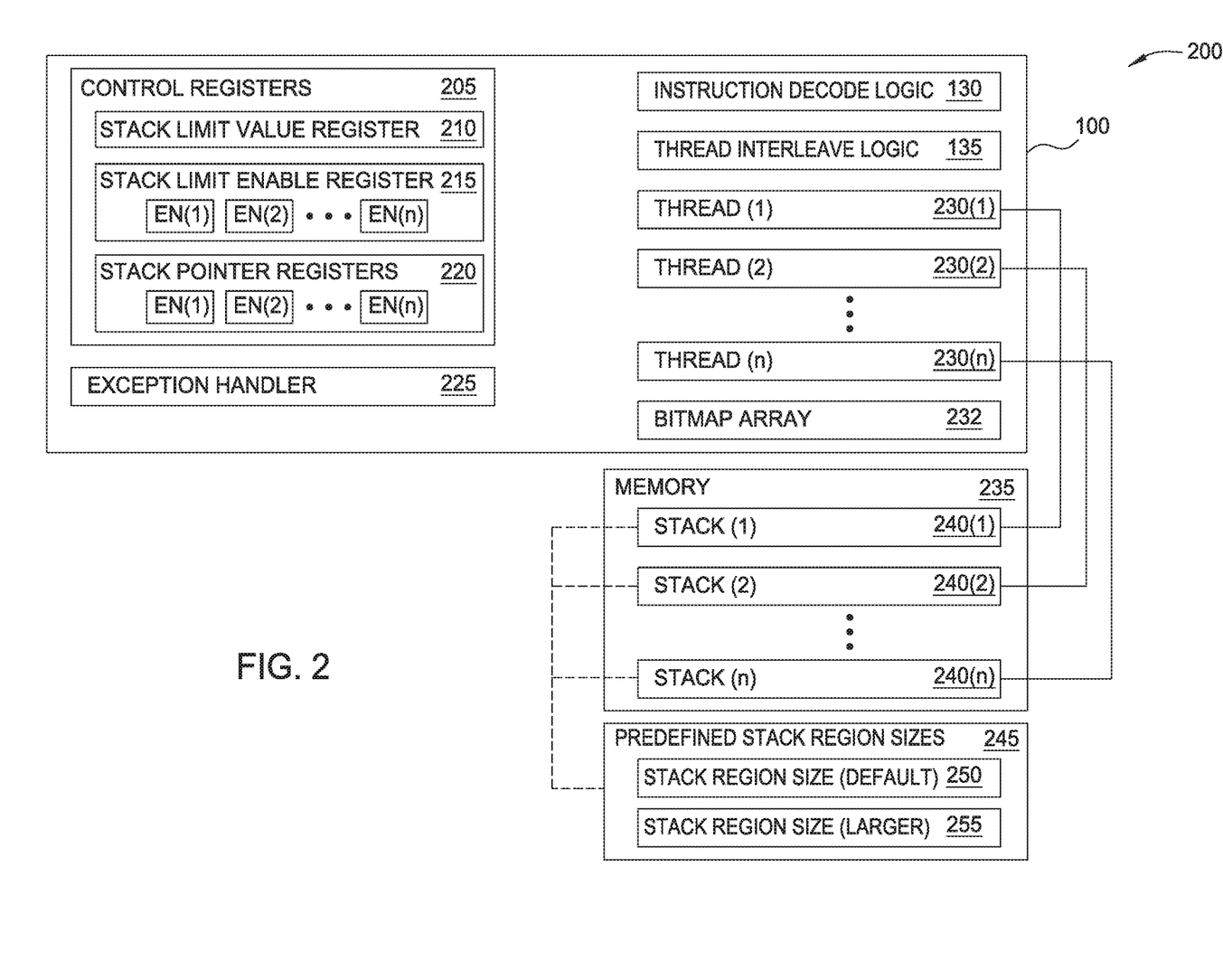
FIG. 2 is a block diagram illustrating an exemplary arrangement of control registers used for allocating stack regions for threads, according to one or more embodiments disclosed herein.

FIG. 2 is a block diagram illustrating an exemplary arrangement of control registers used for allocating stack regions for threads, according to one or more embodiments disclosed herein. Within arrangement 200, the multithreaded processor 100 comprises a plurality of control registers 205 including a stack limit value register 210, a stack limit enable register 215 storing a plurality of stack limit enable bits EN(1), EN(2), . . . , EN(n), and stack pointer registers 220. Each of the n stack pointer registers 220 (i.e., stack pointer registers SP(1), SP(2), . . . , SP(n)) includes a stack pointer value corresponding to one thread of the plurality of threads 230(1), 230(2), . . . 230(n).

Each thread 230(1), 230(2), . . . 230(n) corresponds to a stack 240(1), 240(2), . . . , 240(n) included in a memory 235. Each stack 240(1), 240(2), . . . , 240(n) generally represents a memory structure used by a high-level language for performing functions and/or subroutines. For example, the stacks 240(1), 240(2), . . . , 240(n) may be used to pass arguments and/or temporary values for function calls or returns when not enough memory is available in the local registers of the multithreaded processor 100. The memory 235 may be included on a common integrated circuit (IC) with the multithreaded processor 100, or may be separately arranged. Generally, initial values of the stack pointer registers SP(1), SP(2), . . . , SP(n) include an address corresponding to the top of the respective stack 240(1), 240(2), . . . , 240(n), and as procedures are called and the stack "grows," the values of the stack pointer registers SP(1), SP(2), . . . , SP(n) are updated to include other address values within the respective stack 240(1), 240(2), . . . , 240(n).

In various embodiments discussed herein, each stack 240(1), 240(2), . . . , 240(n) is associated with a particular stack region size of a plurality of predefined stack region sizes 245. Each stack 240(1), 240(2), . . . , 240(n) may be assigned a stack region size 250 by default, and may be allocated a larger stack region size 255 as needed. In some embodiments, upon determining that one of the stacks 240(1), 240(2), . . . , 240(n) would extend beyond a stack limit value stored in a control register 205 (e.g., a dedicated stack limit value register 210), the multithreaded processor 100 migrates (or "reassigns") the particular stack from a first portion of memory 235 associated with the default stack region size 250 to a second portion of memory 235 associated with the larger stack region size 255.

In some embodiments, the memory 235 includes a plurality of first memory pages comprising a first plurality of memory regions each having the default stack region size 250, and a plurality of second memory pages comprising a second plurality of memory regions each having the larger stack region size 255. In some cases, the number of memory regions of the first plurality is greater than the number of memory regions of the second plurality. The first plurality of memory regions are generally configured to support "common" processing tasks, while the second plurality of memory regions are less numerous and configured to support "exceptional" processing tasks.

In one embodiment, the multithreaded processor 100 checks, upon receiving a procedure entry instruction for a particular one of the stacks 240(1), 240(2), . . . , 240(n), whether an updated stack pointer value is less than the stack limit value. In some embodiments, the updated stack pointer value reflects a current stack pointer value that is decremented (or alternately, incremented) by a predefined amount upon receiving the procedure entry instruction.

If the updated stack pointer value is less than the stack limit value, the multithreaded processor 100 takes (or "throws") a stack limit exception, and an exception handler 225 of the multithreaded processor 100 moves the particular stack to another region of memory 235 that is associated with a larger stack region size 255. This corresponds to cases in which the stacks 240(1), 240(2), . . . , 240(n) grow toward lower addresses. In alternative embodiments, where the stacks 240(1), 240(2), . . . , 240(n) grow toward greater addresses, the stack limit exception is thrown when the stack pointer value exceeds the stack limit value. Irrespective of the direction of stack growth, a thrown stack limit exception indicates that the predefined stack region size has been exceeded for the particular stack. However, the stack region size is not explicitly included in the stack limit value register 210; instead, the stack limit value register stores a virtual address corresponding to a lower limit of the (smaller) stack region size.

While two predefined stack region sizes 245 are discussed herein, alternate embodiments may include three or more selectable predefined stack region sizes. For example, another implementation may include a default stack region size 250 and a plurality of other stack region sizes that may be selected based on a determined amount that the updated stack pointer value would be less than the stack limit value. In some embodiments, the thrown stack limit exception is a precise and restartable exception. In these cases, once the stack limit exception has been handled by the exception handler 225, the multithreaded processor 100 resumes its operation by restarting the particular instruction without disturbing code execution.

In some embodiments, the stack limit value register 210 (and the stack limit value stored therein) is shared between the multiple threads 230(1), 230(2), . . . , 230(n). Including a single shared register for the threads 230(1), 230(2), . . . , 230(n) generally saves space, when compared with implementations including multiple registers, e.g., maintaining a distinct stack limit value for each of the stacks 240(1), 240(2), . . . , 240(n). In embodiments using a shared stack limit value register 210, the stack limit value represents an address shared by the stacks 240(1), 240(2), . . . , 240(n) within the virtual address space.

In this way, the multithreaded processor 100 operates within the virtual address space, and relies upon the memory management system to ensure that each thread 230(1), 230(2), . . . , 230(n) has a unique address in the physical address space. In other words, based on which thread 230(1), 230(2), . . . , 230(n) accesses the stack limit value, the translation (or "mapping") provided through the memory management system causes a different physical address to be identified for the thread. The translation provided by the memory management system may be implemented using any suitable techniques known to the person of ordinary skill in the art, such as through a distinct memory management unit (MMU) and/or TLB structures.

The multithreaded processor 100 further comprises a bitmap array 232 configured to reflect locations of one or more stacks 240(1), 240(2), . . . , 240(n) within second memory pages associated with the larger stack region size 255. In some embodiments, the bitmap array 232 is accessed during the process of reassigning one or more stacks 240(1), 240(2), . . . , 240(n) from first memory pages associated with the default stack region size 250, in order to identify regions of the second memory pages that match the alignment (e.g., an offset amount) of the stack's memory region within the first memory pages. The bitmap array 232 is generally updated when stacks are reassigned to or from the second memory pages. In some embodiments, because the bitmap array 232 is a shared memory structure, updates to the bitmap array 232 use either atomic operations or mutual exclusion techniques to ensure correct operation.

Embodiments of the multithreaded processor 100 provide an adaptive memory allocation for a plurality of stacks 240(1), 240(2), . . . , 240(n). Generally, providing adaptive memory allocation results in reduced memory requirements for collectively supporting the stacks 240(1), 240(2), . . . , 240(n) during operation of the multithreaded processor 100. The reduced memory requirements in turn can support lower production costs by including a smaller memory 235, and/or support an increased functionality of the multithreaded processor 100 within a fixed amount of memory 235. For example, reduced memory requirements may allow additional threads to be supported by the multithreaded processor 100. Further, even a slight reduction of memory requirements for certain ones of the stacks 240(1), 240(2), . . . , 240(n) may have significant collective memory savings, as some embodiments of the multithreaded processor 100 may support hundreds or thousands of independent threads (or more). Further, the granularity of the stack limit value register 210 may be selected to reduce collective memory requirements for the stacks 240(1), 240(2), . . . , 240(n). In some embodiments, the stack limit value register 210 is more than byte granular. For example, for a 512-byte granular stack limit value register 210, nine (9) bits are removed from the stack limit value register 210 and several kilobytes of memory may collectively be saved.

The adaptive memory allocation can provide suitable performance for common processing tasks while adapting for one or more types of exceptional processing tasks. For example, in the case of a network processor that processes and/or routes network traffic (e.g., IPv4 or IPv6 data packets), "standard" received packets that may be routed without requiring significant additional processing by the network processor correspond to a relatively small size for stacks 240(1), 240(2), . . . , 240(n). However, for received packets requiring significant additional processing by the network processor and/or accessing other hardware, one or more of the stacks 240(1), 240(2), . . . , 240(n) can grow significantly larger than in the "standard" case.

Further, implementing the adaptive memory allocation at least partially using the hardware of the multithreaded processor 100 can generally result in less complex programming, as the programmers need not know or account for stack growth conditions since the hardware can assist with detecting the stack growth conditions and transitioning the stacks to larger memory regions.

In some embodiments, the stack limit enable register 215 stores the plurality of stack limit enable bits EN(1), EN(2), . . . , EN(n), and each stack limit enable bit EN(1), EN(2), . . . , EN(n) corresponds to a respective one of the stacks 240(1), 240(2), . . . , 240(n). Each stack limit enable bit EN(1), EN(2), . . . , EN(n) selects whether the updated stack pointer value will be checked against the stack limit value (e.g., stored within stack limit value register 210). For example, when the EN bit is set, upon receiving a procedure entry instruction, the multithreaded processor 100 checks the updated stack pointer value against the stack limit value. If the EN bit is clear, the multithreaded processor 100 does not check the updated stack pointer value against the stack limit value.

Thus, in some embodiments, all of the threads 230(1), 230(2), . . . , 230(n) may share a same stack limit value, but each thread 230(1), 230(2), . . . , 230(n) individually has an stack limit enable bit EN(1), EN(2), . . . , EN(n). At any given time during operation of the multithreaded processor 100, a first portion of the threads 230(1), 230(2), . . . , 230(n) can use the default stack region size 250 while a second portion of the threads 230(1), 230(2), . . . , 230(n) can use the larger stack region size 255.

Each stack limit enable bit EN(1), EN(2), . . . , EN(n) can serve as an indicator for which stack region size regime within which a particular thread 230(1), 230(2), . . . , 230(n) is operating. Once a particular thread 230(1), 230(2), . . . , 230(n) has crossed the stack limit value, and the corresponding stack 240(1), 240(2), . . . , 240(n) has been moved or reassigned to a portion of memory 235 corresponding to the larger stack region size 255, the corresponding stack limit enable bit EN(1), EN(2), . . . , EN(n) is cleared so that future procedure calls associated with the thread 230(1), 230(2), . . . , 230(n) need not be checked against the stack limit value, saving time and/or processing resources. In the example depicted in FIG. 2 having two predefined stack region sizes 250, 255, it can be assumed that once a particular thread 230(1), 230(2), . . . , 230(n) operates within the larger stack region size 255 regime, there is no need to check updated stack pointer values against the stack limit value. Instead, the multithreaded processor 100 may rely on some other mechanism, such as a memory management unit, to avoid writing beyond the bounds of the stack 240(1), 240(2), . . . , 240(n) allocated to a portion of memory 235.

In a similar manner, once a particular thread 230(1), 230(2), . . . , 230(n) no longer needs the additional memory of the larger stack region size 255, the thread 230(1), 230(2), . . . , 230(n) may be reassigned to the first portion of memory 235 corresponding to the (smaller) default stack region size 250, and the second portion of memory 235 may be freed for supporting subsequent memory requirements for the threads 230(1), 230(2), . . . , 230(n). Upon reassigning the thread 230(1), 230(2), . . . , 230(n) to the first portion of memory 235, the corresponding stack limit enable bit EN(1), EN(2), . . . , EN(n) is set, indicating that subsequent procedure calls for the thread 230(1), 230(2), . . . , 230(n) should check updated stack pointer values against the stack limit value.

Figure 3:
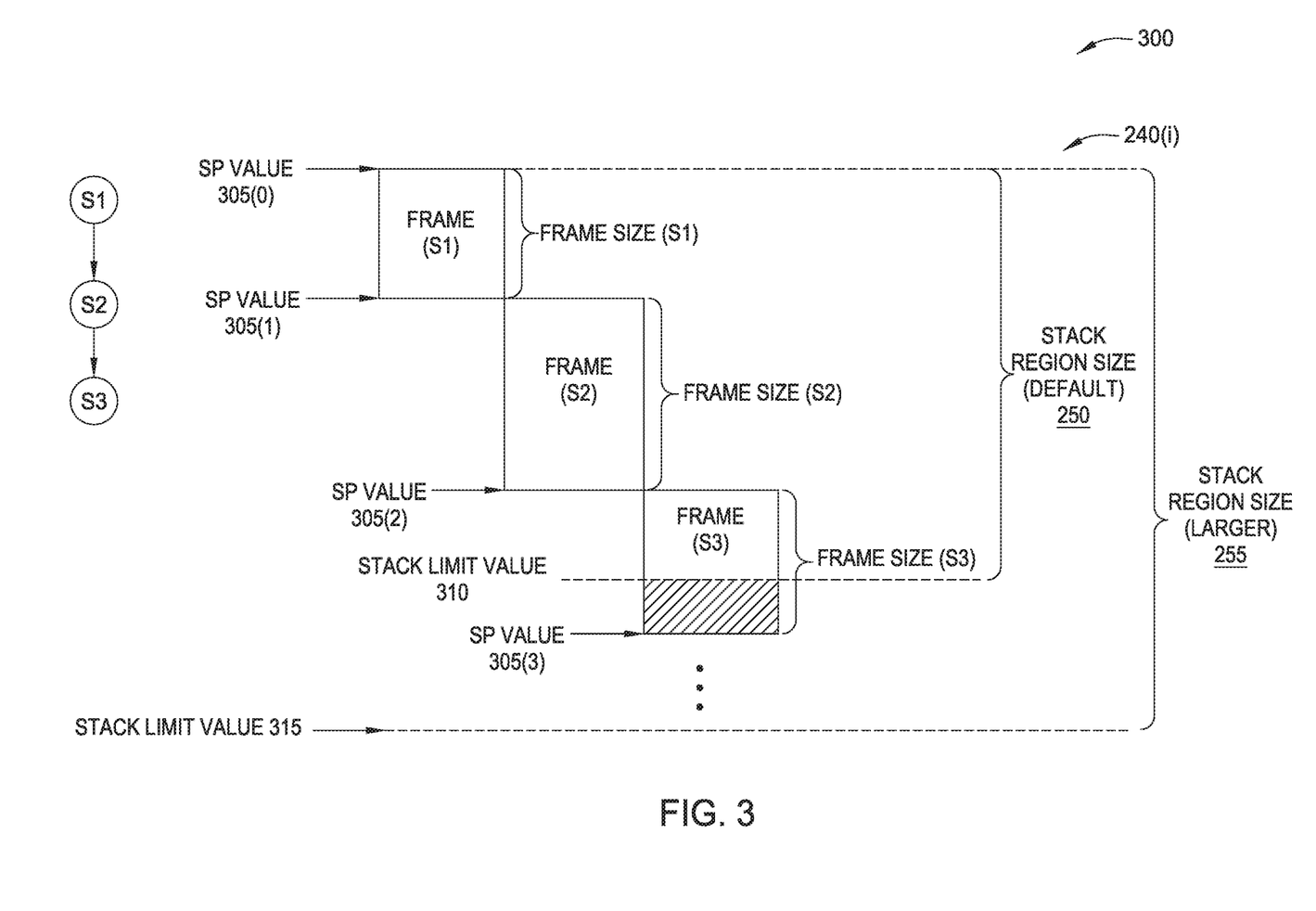
FIG. 3 illustrates performing a stack limit value check upon receiving a procedure entry instruction, according to one or more embodiments disclosed herein.

FIG. 3 illustrates performing a stack limit value check upon receiving a procedure entry instruction, according to one or more embodiments disclosed herein. Diagram 300 may generally correspond to any stack 240(i) of the plurality of stacks 240(1), 240(2), . . . , 240(n), and the stack 240(i) corresponds to a respective thread of the plurality of threads of the multithreaded processor. Further, diagram 300 is intended to be used in conjunction with any of the embodiments discussed herein.

The stack 240(i) is maintained for a series of procedures or subroutines performed by the associated thread, and is initially allotted a default stack region size 250. As shown, the stack 240(i) illustrates a first subroutine S1, which calls a second subroutine S2, which calls a third subroutine S3. The stack pointer (SP) is at an initial SP value 305(0) before the first subroutine S1 is called. When the first subroutine S1 is called, the multithreaded processor determines whether an updated SP value (corresponding to a second SP value 305(1)) would be less than the stack limit value 310. Alternately, the multithreaded processor determines whether the updated SP value would cause the contents of the stack 240(i) to exceed the stack region size 250. Upon determining that the updated SP value is not less than the stack limit value 310, the first subroutine S1 is called and the stack pointer is decremented to the second SP value 305(1). Similarly, after determining that calling the second subroutine would not cause the updated SP value to be less than the stack limit value 310, the SP is decremented to a third SP value 305(2) when the second subroutine S2 is called.

However, when a procedure entry instruction for the third subroutine S3 is received, the multithreaded processor determines that the updated SP value 305(3) would be less than the stack limit value 310, and throws a stack limit exception. In some embodiments, an exception handler causes the stack 240(i) to be reassigned (or migrated or moved) to another portion of memory corresponding to a larger stack region size 255. Within the larger stack region size 255, the third subroutine S3 may be called without the updated SP value being less than the corresponding stack limit value 315. Reassignment of the stack 240(i) is discussed further with respect to FIG. 5, below.

Figure 4:
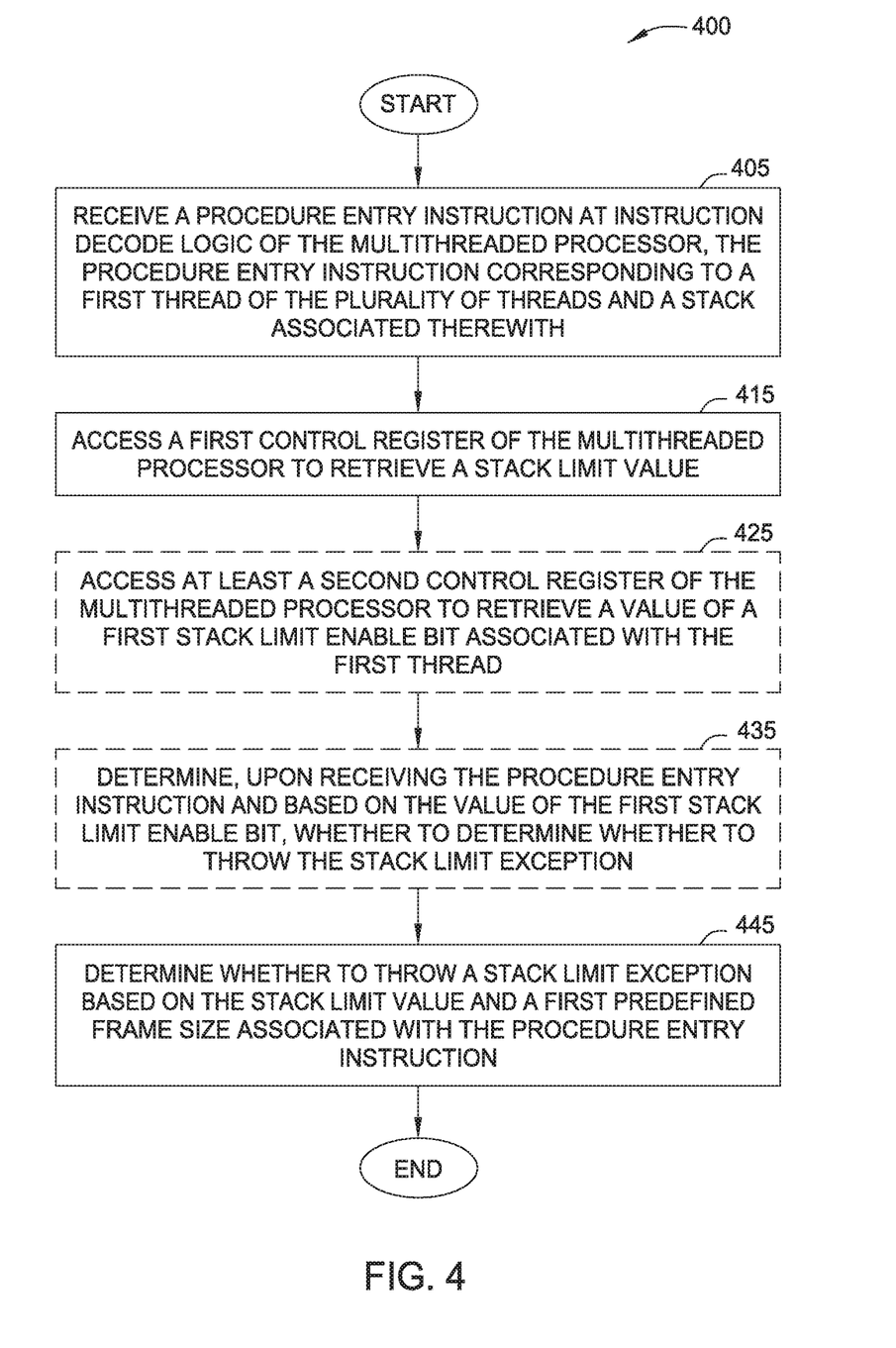
FIG. 4 is a flowchart illustrating a method performed by a multithreaded processor executing a plurality of threads, according to one or more embodiments disclosed herein.

FIG. 4 is a flowchart illustrating a method performed by a multithreaded processor executing a plurality of threads, according to one or more embodiments disclosed herein. Generally, method 400 may be used in conjunction with a multithreaded processor, such as the multithreaded processor 100 depicted in FIG. 2.

Method 400 begins at block 405, where a procedure entry instruction is received at instruction decode logic of the multithreaded processor. The procedure entry instruction corresponds to a first thread of the plurality of threads associated with the multithreaded processor, and the first thread is associated with a stack within a memory. At block 415, the multithreaded processor accesses a first control register to retrieve a stack limit value. In some embodiments, a designated stack limit value register stores the stack limit value. In some embodiments, the stack limit value and/or the stack limit value register is shared by some or all of the plurality of threads.

At an optional block 425, the multithreaded processor accesses at least a second control register to retrieve a value of a first stack limit enable bit associated with the first thread. The first stack limit enable bit generally indicates whether an updated stack pointer value will be checked against the stack limit value. At an optional block 435, the multithreaded processor determines, upon receiving the procedure entry instruction and based on the value of the first stack limit enable bit, whether to determine whether to throw the stack limit exception. In some embodiments, when the first stack limit enable bit is set, the multithreaded processor determines to check the updated stack pointer value against the stack limit value. When the first stack limit enable bit is cleared, the updated stack pointer value need not be checked. In some embodiments, the first stack limit enable bit serves as an indicator for which stack region size regime within which the associated thread is operating. For example, when the first stack limit enable bit is set, the stack is included in a memory region associated with a default stack region size. When the first stack limit enable bit is cleared, the stack is included in another memory region associated with a larger stack region size. In alternate embodiments, a stack region size for the stack may be adaptively selected from more than two predefined stack region sizes.

At block 445, the multithreaded processor determines whether to throw a stack limit exception based on the stack limit value and a first predefined stack region size associated with the stack. Method 400 ends following completion of block 445.

Figure 5:
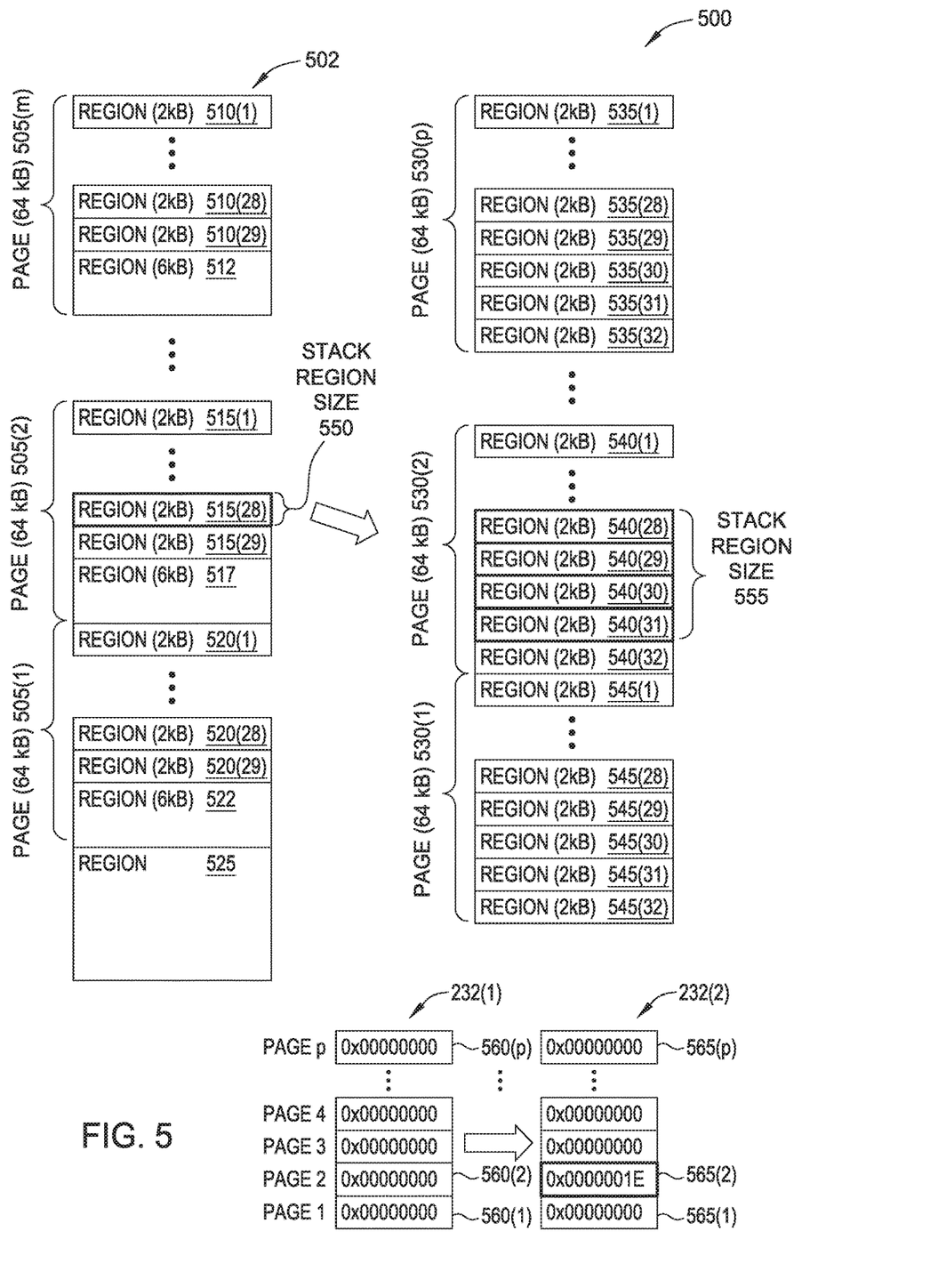
FIG. 5 illustrates a reassignment of a stack from a first stack region size to a second stack region size, according to one or more embodiments disclosed herein.

FIG. 5 illustrates a reassignment of a stack from a first stack region size to a second stack region size, according to one or more embodiments disclosed herein. Generally, diagram 500 may represent reassignment of the stack between different portions of a memory, such as the memory 235 of FIG. 2.

Within diagram 500, the memory includes a first portion 502 comprising a plurality of first memory pages 505(1), 505(2), . . . , 505(m), and a second portion 528 comprising a plurality of second memory pages 530(1), 530(2), . . . , 530(p). As shown, each of the first memory pages 505(i) and second memory pages 530(j) has a same size of 64 kilobytes (kB), where i=1:m and j=1:p. Alternate embodiments may include a different sizing for the memory pages 505(i) and/or 530(j). Further, while the first portion 502 and the second portion 528 are each shown as including contiguous memory pages, alternate embodiments may include non-contiguous memory pages.

Each of the first memory pages 505(1), 505(2), . . . , 505(m) corresponds to a first stack region size 550, and each of the second memory pages 530(1), 530(2), . . . , 530(p) corresponds to a second stack region size 555. In one embodiment, the first stack region size 550 is the default stack region size 250 of FIG. 2, and the second stack region size 555 is the larger stack region size 255 of FIG. 2. As shown, the first stack region size 550 is 2 kB and the second stack region size 555 is 8 kB, though other values are possible.

Each of the first memory pages 505(1), 505(2), . . . , 505(m) includes a number of memory regions 510, 515, 520 of the first stack region size 550, and at least one other memory region 512, 517, 522. The other memory region 512, 517, 522 may be sized based on a difference between the first stack region size 550 and the second stack region size 555, such that a sum of the first stack region size 550 and the size of the other memory region 512, 517, 522 at least equals the second stack region size 555. As shown, the 64 kB of each first memory page 505(1), 505(2), . . . , 505(m) is divided between twenty-nine (29) regions 510(1)-510(29), 515(1)-515(29), 520(1)-520(29) of 2 kB, and one other region 512, 517, 520 of 6 kB. Including the 6 kB other memory region 512, 517, 522 ensures that each 2 kB memory region 510(1)-510(29), 515(1)-515(29), 520(1)-520(29) can be mapped into a corresponding 8 kB within the second memory pages 530(1), 530(2), . . . , 530(p) while maintaining the same offset within the first memory page and the second memory page.

The other memory region 512, 517, 522 generally permits an address in the virtual space to be translated into an address in the physical space. If a particular stack (included in a memory region 510, 515, 520) needs to grow beyond the 2 kB limit, the 6 kB of the other memory region 512, 517, 522 allows a total of 8 kB, without requiring an adjustment of the offset of the stack pointer. Thus, including the appropriately sized other memory region 512, 517, 522 simplifies the reassignment of a stack from a first memory page 505(1), 505(2), . . . , 505(m) to a second memory page 530(1), 530(2), . . . , 530(p), as the data may be moved and an associated page mapping (e.g., in a MMU) updated without requiring performing additional processing of the stack. For example, the stack reassignment may be performed without the complexity of scanning the contents of the stack and fixing up addresses included therein.

Each of the second memory pages 530(1), 530(2), . . . , 530(p) includes a number of memory regions 535, 540, 545. As shown, the 64 kB of each second memory page 530(1), 530(2), . . . , 530(p) is divided between thirty-two (32) regions 535(1)-535(32), 540(1)-540(32), 545(1)-545(32) of 2 kB each. Within each second memory page 530(1), 530(2), . . . , 530(p), a 2 kB region from a first memory page 505(1), 505(2), . . . , 505(m) is mapped into a block of four (4) contiguous regions 535, 540, 545 with an arbitrary 2 kB alignment. The block of four (4) contiguous regions corresponds to the second stack region size 555—here, four contiguous 2 kB regions corresponds to the 8 kB second stack region size.

An exemplary reassignment of a stack stored in a 2 kB region 515(28) of a first memory page 505(2) will now be discussed. In order to move the stack from the first memory page 505(2) to an 8 kB block within a second memory page 530(1), 530(2), . . . , 530(p) without requiring additional processing of the stack, the top address of a 2 kB region 540(28) included in the block should match the top address of the 2 kB region (i.e., at a memory region having an index (28)). Thus, the MMU stack entry for the thread may be updated to change the physical space portion of the mapping without adjusting the virtual space portion.

To effectively map a stack into an 8 kB block having an arbitrary 2 kB alignment, the exception handler determines whether an 8 kB block having a top-most region at index (28) of a second memory page 530(1), 530(2), . . . , 530(p) is available. In some embodiments, a bitmap array (e.g., bitmap array 232 of FIG. 2) is maintained to reflect which regions of the second memory pages 530(1), 530(2), . . . , 530(p) are occupied at any given time, and the exception handler accesses the bitmap array to determine whether a suitable block is available.

Bitmap array 232(1) shows a state of the bitmap array at a first time prior to reassigning the stack at region 515(28) to a second memory page. Each of entries 560(1), 560(2), . . . 560(p) of the bitmap array are zeroed at the first time, indicating that none of the 2 kB regions included in pages 1-p (that is, the second memory pages 530(1)-530(p)) are occupied. The bitmap array 232(2) shows the updated bitmap array at a second time after reassigning the stack to the second memory page 530(2). As shown, entry 565(2) corresponding to the second memory page 530(2) has a hex value of "0000001E". Thus, memory regions 540(25)-540(28) correspond to a hex value of "1" and memory regions 540(29)-540(32) correspond to a hex value of "E", collectively indicating that a block of memory regions 540(28), 540(29), 540(30), and 540(31) are occupied by the reassigned stack. The block is offset from the base of second memory page 530(2) by a single 2 kB region 540(32).

Thus, once a stack limit exception has occurred or is predicted to occur due to the stack in the first memory page (e.g., in region 515(28)) being less than a stack limit value, the exception handler (or other software executed by the multithreaded processor) searches the bitmap array for a contiguous block of 2 kB regions within the second memory pages 530(1), 530(2), . . . , 530(p) that match the alignment of the 2 kB region from the first memory page 505(1), 505(2), . . . , 505(m). In some embodiments, once a contiguous block has been located, shared memory techniques are used to indivisibly update the bitmap array. In this ways, a region from a first memory page 505(1), 505(2), . . . , 505(m) can be copied into a highest-numbered region in a second memory page 530(1), 530(2), . . . , 530(p) and the thread can resume its operation. Table 1, included below, includes exemplary pseudocode for reassigning a stack from a first memory page 505(1), 505(2), . . . , 505(m) to a second memory page 530(1), 530(2), . . . , 530(p).

530(2), . . . , 530(p) to a first memory page 505(1), 505(2), . . . , 505(m). For example, using the example of FIG. 2, upon returning from subroutine S2 to S1 the stack is reassigned to a first memory page 505(1), 505(2), . . . , 505(m). In an alternate embodiment, the stack is reassigned upon determining that the thread has returned from the particular subroutine which caused the updated SP value to be less than the stack limit value (e.g., returned from subroutine S3 to S2).

In one embodiment, the multithreaded processor determines whether the stack limit enable bit for the stack is set. If the stack limit enable bit is cleared (e.g., indicating that the stack is included in a second memory page 530(1),

TABLE 1

Example pseudocode for reassigning a stack from a first memory page to a second memory page Assumptions:

A. An array of 2 kB small stack memory regions in 64 kB physical address pages, each page containing (29) 2 kB-aligned 2 kB regions, with a 6 kB region reserved at the base (lowest address) of the page. The 6 kB reserved region ensures that an 8 kB region will exist in a large stack page and that the 8 kB region will not span a page boundary.
B. An array of 2 kB large stack components in 64 kB physical address pages, each page containing (32) 2 kB-aligned 2 kB regions. Four (4) contiguous components with an arbitrary 2 kB alignment within a large stack page form an 8 kB large stack.
C. An array of bitmaps, where each bitmap is associated with a specific large stack page and each bit in the bitmap corresponds to a 2 kB region in the page.
D. Initially, all bits are clear in the array of bitmaps.

Pseudocode:

1. Locate target page.
a. Obtain a lock to manipulate the bitmap array using a spin lock or other algorithm known to those skilled in the art.
b. Compute a binary value corresponding to the 2 kB components of the 8 kB region in a large stack page for the small stack to be migrated. This is the large stack bit mask.
c. Loop over the elements in the array of bitmaps:
(1) Compute the bitwise logical AND of the large stack bit mask and the 1's complemented current bitmap array element.
(2) If the result of the bitwise logical AND is equal to the large stack bit mask then the large stack page corresponding to the current element will be the target page and exit the loop.
d. If no target page was found, release the lock and return to step 1 to re-acquire the lock and repeat the loop.
e. If a target page was found, logically OR the large stack bit mask into the associated bitmap element.
f. Release the lock.
2. Move page data.
a. For each 64 B region in the 2 kB stack in the small stack page in the virtual address space:
(1) Move the physical address of the small stack page into the memory management unit translation lookaside buffer entry corresponding to the stack
(2) Load the 64 B region into the CPU registers from the small stack physical address page.
(3) Move the physical address of the target large stack page into the memory management unit translation lookaside buffer entry corresponding to the stack.
(4) Store the 64 B region from the CPU registers to the large stack physical address page.
b. Clear the stack limit exception enable corresponding to the current thread.
c. Resume instruction execution at the procedure entry where the stack limit exception was detected.

At some point, the stack may no longer require the additional memory provided within the second memory page 530(1), 530(2), . . . , 530(p), such as after the thread returns from a subroutine. In such a case, it may be beneficial to return the stack to a first memory page 505(1), 505(2), . . . , 505(m) to free up the second memory pages 530(1), 530(2), . . . , 530(p) for handling subsequent stack limit exceptions.

In one embodiment, when a particular thread returns to its main (or parent) subroutine, the stack is reassigned (or migrated or moved) from a second memory page 530(1), 530(2), . . . , 530(p)), the multithreaded processor migrates the 2 kB region at the highest address of the 8 kB block back to the first memory page 505(1), 505(2), . . . , 505(m), clears the associated bits of the bitmap array, and sets the stack limit enable bit. The thread is thus configured to use the memory region within the first memory page 505(1), 505(2), . . . , 505(m) until a subsequent stack limit exception. Table 2, included below, includes exemplary pseudocode for reassigning a stack from a second memory page 530(1), 530(2), . . . , 530(p) to a first memory page 505(1), 505(2), . . . , 505(m).

TABLE 2

Example pseudocode for reassigning a stack from a second memory page to a first memory page Assumptions:

A. An array of 2 kB small stack regions in 64 kB physical address pages, each page containing (29) 2 kB-aligned 2 kB regions, with a 6 kB region reserved at the base (lowest address) of the page. The 6 kB reserved region insures that an 8 kB region will exist in a large stack page and that the 8 kB region will not span a page boundary.
B. An array of 2 kB large stack components in 64 kB physical address pages, each page containing (32) 2 kB-aligned 2 kB regions. Four (4) contiguous components with an arbitrary 2 kB alignment within a large stack page form an 8 kB large stack.
C. An array of bitmaps, where each bitmap is associated with a specific large stack page and each bit in the bitmap corresponds to a 2 kB region in the page.

Pseudo-Code:

1. Move page data.
a. For each 64 B region in the highest-numbered 2 kB region in a 8 kB stack in a large stack page in the virtual address space:
(1) Move the physical address of the large stack page into the memory management unit translation lookaside buffer entry corresponding to the stack.
(2) Load the 64 B region into the CPU registers from the large stack physical address page.
(3) Move the physical address of the target large small page into the memory management unit translation lookaside buffer entry corresponding to the stack.
(4) Store the 64 B region from the CPU registers to the small stack physical address page.
b. Obtain a lock to manipulate the bitmap array using a spin lock or other algorithm.
c. In the bitmap array element associated with the large stack page, clear the bits corresponding to the (4) 2 kB regions that formed the 8 kB stack.
d. Release the lock.
e. Set the stack limit exception enable corresponding to the current thread.

Figure 6:
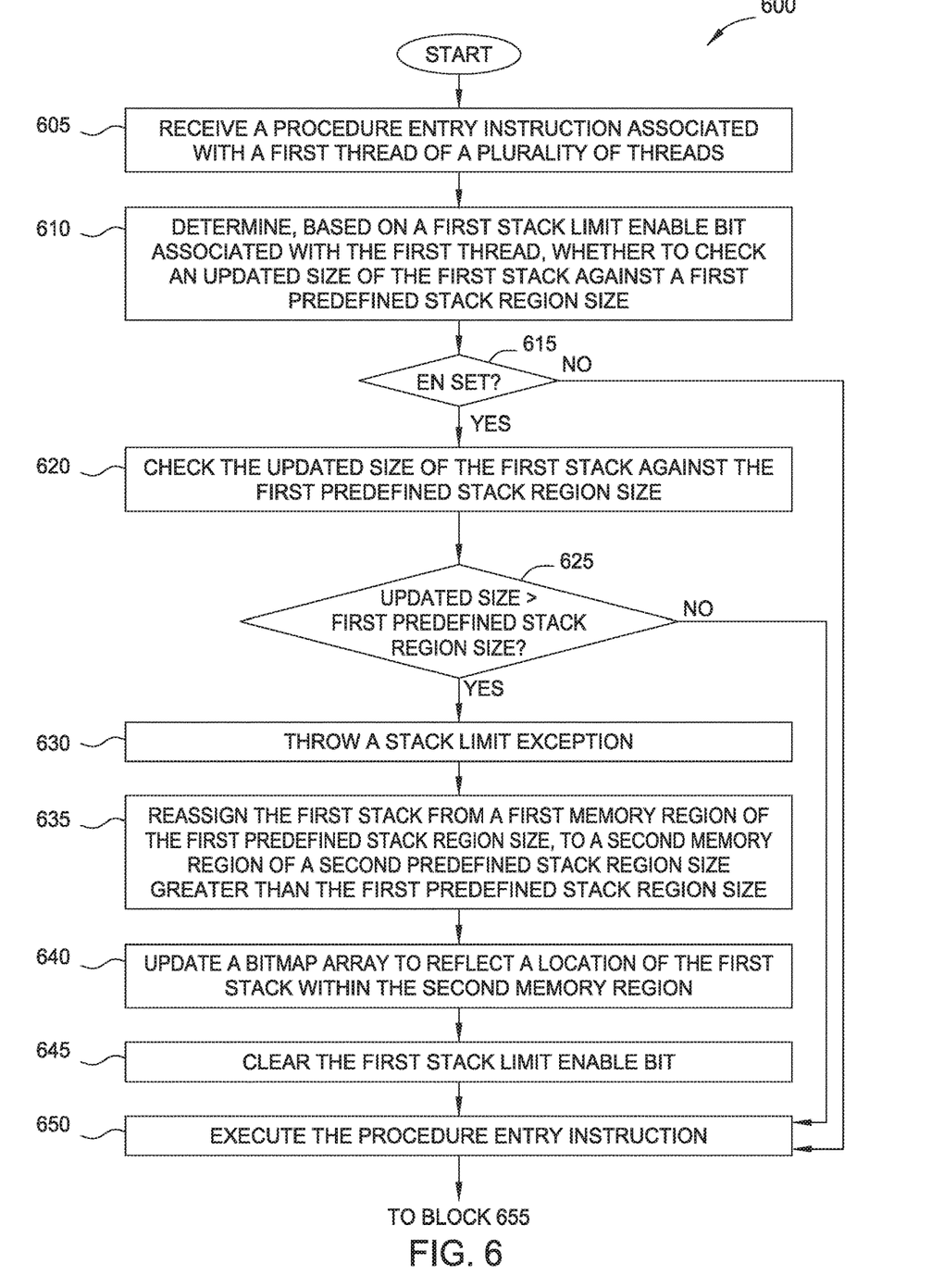
FIG. 6 is a flowchart illustrating a method performed by a multithreaded processor executing a plurality of threads, according to one or more embodiments disclosed herein.

FIG. 6 is a flowchart illustrating a method performed by a multithreaded processor executing a plurality of threads, according to one or more embodiments disclosed herein. Generally, method 600 may be used in conjunction with a multithreaded processor, such as the multithreaded processor 100 depicted in FIG. 2. Method 600 may further be used in conjunction with any of the embodiments discussed herein.

Method 600 begins at block 605, where a procedure entry instruction associated is received. The procedure entry instruction is associated with a first thread of a plurality of threads. At block 610, the multithreaded processor determines, based on a first stack limit enable bit associated with the first thread, whether to check an updated size of the first stack against a first predefined stack region size. If the first stack limit enable bit (EN) is cleared at block 615 ("NO"), the method proceeds to block 650 and the procedure entry instruction is executed.

However, if the first stack limit enable bit is set at block 615 ("YES"), the method proceeds to block 620 and the multithreaded processor checks the updated size of the first stack against the first predefined stack region size. If the updated size does not exceed the first predefined stack region size at block 625 ("NO"), the method proceeds to block 650 and the procedure entry instruction is executed.

However, if the updated size exceeds the first predefined stack region size at block 625 ("YES"), the method proceeds to block 630 and the multithreaded processor throws a stack limit exception. At block 635, the multithreaded processor (such as an exception handler) reassigns the first stack from a first memory region of a first predefined stack region size to a second memory region of a second predefined stack region size. The second predefined stack region size is greater than the first predefined stack region size. At block 640, the multithreaded processor updates a bitmap array to reflect a location of the first stack within the second memory region. At block 645, the multithreaded processor clears the first stack limit enable bit. At block 650, the multithreaded processor executes the procedure entry instruction.

At block 655, the first thread returns to a main subroutine. Upon determining at block 660 that the first stack limit enable bit is set ("NO"), the method terminates. However, upon determining at block 660 that the first stack limit enable bit is cleared ("YES"), indicating that the stack is included in the second memory region, the multithreaded processor at block 665 reassigns a portion of the second memory region corresponding to the first predefined stack region size to the first memory region. At block 670, the multithreaded processor updates the bitmap array to reflect the reassignment of the first stack to the first memory region. At block 675, the multithreaded processor sets the first stack limit enable bit and the method terminates.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A multithreaded processor for executing a plurality of threads, the multithreaded processor comprising:
   a first control register configured to store a stack limit value;
   a second control register configured to store a plurality of stack limit enable bits, each stack limit enable bit of the plurality of stack limit enable bits corresponding to a respective thread of the plurality of threads; and
   instruction decode logic configured to:
      determine, responsive to receiving a first procedure entry instruction for a stack associated with a first thread of the plurality of threads, a value of a first stack limit enable bit of the plurality of stack limit enable bits that is associated with the first thread;
      check the stack limit value when the value indicates a first state of the first stack limit enable bit;
      responsive to the first stack limit enable bit being in the first state, determine whether to throw a stack limit exception based on the stack limit value and a first predefined stack region size associated with the stack;

set the first stack limit enable bit to a second state; and
responsive to the first stack limit enable bit being in the second state, execute a second procedure entry instruction associated with the first thread without checking the stack limit value.

2. The multithreaded processor of claim 1, wherein the stack limit value is shared by the plurality of threads.

3. The multithreaded processor of claim 1, wherein determining whether to throw a stack limit exception comprises:
retrieving a current stack pointer value associated with the first thread; and
determining an updated stack pointer value based on the current stack pointer value and the first predefined stack region size associated with the first thread,
wherein the stack limit exception is thrown when the updated stack pointer value is less than the stack limit value.

4. The multithreaded processor of claim 1, further comprising:
an exception handler configured to handle the stack limit exception by moving the stack from a first memory location associated with the first predefined stack region size to a second memory location associated with a second predefined stack region size greater than the first predefined stack region size.

5. The multithreaded processor of claim 4, wherein the stack limit exception is a precise stack limit exception, and wherein the procedure entry instruction is restarted upon moving the stack from the first memory location to the second memory location.

6. The multithreaded processor of claim 1,
wherein, when the first stack limit enable bit is set, the instruction decode logic determines whether to throw the stack limit exception, and
wherein, when the first stack limit enable bit is cleared, the instruction decode logic does not determine whether to throw the stack limit exception.

7. The multithreaded processor of claim 1, wherein the value of the first stack limit enable bit indicates a stack region size for a memory region in which the stack is included.

8. The multithreaded processor of claim 4, wherein setting the first stack limit enable bit to the second state is responsive to moving the first stack to the second memory location.

9. A method performed by a multithreaded processor executing a plurality of threads, the method comprising:
receiving a procedure entry instruction at instruction decode logic of the multithreaded processor, the procedure entry instruction corresponding to a first thread of the plurality of threads and to a stack associated with the first thread;
retrieving a value of a first stack limit enable bit of a plurality of stack limit enable bits stored in a second control register of the multithreaded processor, wherein each stack limit enable bit of the plurality of stack limit enable bits corresponds to a respective thread of the plurality of threads, and wherein the first stack limit enable bit is associated with the first thread; and
accessing, when the value indicates that the first stack limit enable bit is in a first state, a first control register of the multithreaded processor to retrieve a stack limit value; and
responsive to the first stack limit enable bit being in the first state, determining whether to throw a stack limit exception based on the stack limit value and a first predefined stack region size associated with the procedure entry instruction,
wherein, when the value indicates that the first stack limit enable bit is in a second state, the instruction decode logic is configured to execute the procedure entry instruction without retrieving the stack limit value.

10. The method of claim 9, wherein the stack limit value is shared by the plurality of threads.

11. The method of claim 9, wherein determining whether to throw a stack limit exception comprises:
retrieving a current stack pointer value associated with the first thread; and
determining an updated stack pointer value based on the current stack pointer value and the first predefined stack region size associated with the procedure entry instruction and executed by the first thread,
wherein the stack limit exception is thrown when the updated stack pointer value is less than the stack limit value.

12. The method of claim 9, further comprising:
handling, using an exception handler of the multithreaded processor, the stack limit exception by moving the stack from a first memory location associated with the first predefined stack region size to a second memory location associated with a second predefined stack region size greater than the first predefined stack region size.

13. The method of claim 12, wherein the stack limit exception is a precise stack limit exception, the method further comprising:
restarting the procedure entry instruction upon moving the stack from the first memory location to the second memory location.

14. The method of claim 12, further comprising:
setting the first stack limit enable bit to the second state responsive to moving the first stack to the second memory location.

15. A system comprising:
a multithreaded processor configured to execute a plurality of threads, wherein the multithreaded processor comprises a first control register configured to store a stack limit value, and a second control register configured to store a plurality of stack limit enable bits, and wherein each stack limit enable bit of the plurality of stack limit enable bits corresponds to a respective thread of the plurality of threads; and
a memory coupled with the multithreaded processor and comprising:
a plurality of first memory pages, each first memory page comprising a first plurality of memory regions each having a first predefined stack region size, a first stack assigned to a first memory region of the first plurality of memory regions, the first stack corresponding to a first thread of the plurality of threads; and
a plurality of second memory pages, each second memory page comprising a second plurality of memory regions each having a second predefined stack region size greater than the first predefined stack region size, wherein the multithreaded processor is configured to:
determine, responsive to receiving a first procedure entry instruction for the first stack, that a first stack limit enable bit of the plurality of stack limit enable bits is in a set state, wherein the first stack limit enable bit is associated with the first thread;
check the stack limit value responsive to the first stack limit enable bit;

throw a stack limit exception responsive to the stack limit value;

reassign, responsive to throwing the stack limit exception, the first stack to a second memory region of the second plurality of memory regions;

clear the first stack limit enable bit responsive to reassigning the first stack to the second memory region; and responsive to receiving a second procedure entry instruction associated with the first thread, execute the second procedure entry instruction without checking the stack limit value.

16. The system of claim 15, wherein the multithreaded processor is further configured to:

update, upon reassigning the first stack to the second memory region, a bitmap array to reflect a location of the first stack within a corresponding page of the plurality of second memory pages.

17. The system of claim 15, wherein each first memory page of the plurality of first memory pages includes a respective third memory region, the third memory region being sized such that a sum of the first predefined stack region size with a size of the third memory region at least equals the second predefined stack region size.

18. A method performed by a multithreaded processor executing a plurality of threads, the multithreaded processor coupled with a memory comprising a plurality of first memory pages, each first memory page comprising a first plurality of memory regions each having a first predefined stack region size, a first stack assigned to a first memory region of the first plurality of memory regions, the first stack corresponding to a first thread of the plurality of threads, the method comprising:

determining, responsive to receiving a first procedure entry instruction for the first stack, that a first stack limit enable bit is in a set state, the first stack limit enable bit of a plurality of stack limit enable bits stored in a control register of the multithreaded processor, wherein the first stack limit enable bit is associated with the first thread;

checking a stack limit value responsive to the first stack limit enable bit;

throwing a stack limit exception responsive to the stack limit value;

reassigning, responsive to throwing the stack limit exception, the first stack to a second memory region within the memory, the memory further comprising a plurality of second memory pages, each second memory page comprising a second plurality of memory regions each having a second predefined stack region size greater than the first predefined stack region size;

clearing the first stack limit enable bit responsive to reassigning the first stack to the second memory region; and responsive to receiving a second procedure entry instruction associated with the first thread, executing the second procedure entry instruction without checking the stack limit value.

19. The method of claim 18, further comprising:

updating, upon reassigning the first stack to the second memory region, a bitmap array to reflect a location of the first stack within a corresponding page of the plurality of second memory pages.

20. The method of claim 18, wherein each first memory page of the plurality of first memory pages includes a respective third memory region, the third memory region being sized such that a sum of the first predefined stack region size with a size of the third memory region at least equals the second predefined stack region size.

* * * * *